United States Patent [19]

Tsuji et al.

[11] Patent Number: 4,939,030

[45] Date of Patent: Jul. 3, 1990

[54] FILM FOR RETAINING FRESHNESS OF VEGETABLES AND FRUITS

[75] Inventors: Shoichi Tsuji, Nagoya; Hazime Musika, Niwagun; Michiyasu Itoh, Kuwana; Junko Hayakawa, Okazaki; Eiji Miyashita, Chuo, all of Japan

[73] Assignees: Mitsui Toatsu Chemicals, Inc.; Ferric Inc., both of Tokyo, Japan

[21] Appl. No.: 395,040

[22] Filed: Aug. 17, 1989

[30] Foreign Application Priority Data

Aug. 19, 1988 [JP] Japan ................................. 63-206730

[51] Int. Cl.$^5$ ............................................... B32B 3/26
[52] U.S. Cl. ................................ 428/315.5; 428/35.7; 428/36.5; 428/315.9; 428/913
[58] Field of Search ................... 428/35.2, 35.7, 36.5, 428/68, 76, 315.5, 315.7, 315.9, 316.6, 913

[56] References Cited

U.S. PATENT DOCUMENTS 4,394,930  7/1983  Korpman ...................... 428/36.5
4,863,788  9/1989  Bellairs et al. ................. 428/315.9

Primary Examiner—William J. Van Balen
Attorney, Agent, or Firm—Scully, Scott, Murphy & Presser

[57] ABSTRACT

Provided is a film for retaining freshness of vegetables and fruits which comprises a synthetic resin film, a microporous resin film and a water-absorbing layer interposed between both said films, said microporous resin film having a maximum pore diameter not larger than 30 microns and a moisture permeability not lower than 100 g/m$^2$/24 hr.

7 Claims, No Drawings

FILM FOR RETAINING FRESHNESS OF VEGETABLES AND FRUITS

BACKGROUND OF THE INVENTION

The present invention relates to a film for retaining the freshness of vegetables and fruits. More particularly, the present invention is concerned with a film for retaining the freshness of vegetables and fruits by controlling the humidity and the concentration of oxygen and that of carbon dioxide in vegetables and fruits packages.

PRIOR ART

As to vegetables and fruits, their value is gradually deteriorated with the lapse of time from harvest until consumption. In more particular terms, because of breathing of vegetables and fruits even after harvest, water is evaporated, causing a "withering" phenomenon, or the decomposition of components results in lowering of sweetness.

In view of the above points, various attempts have been made for a long-period preservation of vegetables and fruits, including low temperature preservation, freezing preservation, and CA storage, that is, preserving vegetables and fruits under the conditions of low oxygen concentration and high carbon dioxide concentration. By placing vegetables and fruits under the condition of low temperature or CA storage (low oxygen concentration and high carbon dioxide concentration) it is intended to suppress their breathing and thereby prevent their growth, water evaporation and their deterioration caused by the decomposition of components.

However, freezing preservation is not considered to be so effective because coloring matters and taste are sometimes degraded, resulting in a mouth feel quite different from that in fresh condition.

At present, it is considered that the most effective long-period preservation can be attained by satisfying all optimum conditions of (i) temperature, (ii) humidity and (iii) gas composition, and studies are being made to satisfy them.

As one method, refrigerators having an additional function capable of controlling humidity and gas composition are now adopted for storage in some places of production of vegetables and fruits. However, since the entire apparatus is large-scaled, it is difficult to keep the interior uniform in humidity and gas composition. Besides, a considerable cost is required, so it is impossible to use such apparatus in ordinary homes.

As a method which permits easy storage of vegetables and fruits in places of production of vegetables and fruits and permits easy adoption in ordinary homes and which is far less expensive than the above apparatus and expected to satisfy the foregoing optimum conditions of (i), (ii) and (iii), there has been adopted a method wherein vegetables and fruits are sealed in various packages and preserved at certain low temperatures. By the preservation in a sealed condition it is intended to prevent the evaporation of water and expect the CA effect.

As materials of such packages there are known papers and various plastic films. Papers, however, cannot afford the CA effect, and because of high moisture permeability of paper itself, it is impossible to suppress the water evaporated from vegetables and fruits, thus resulting in "loss of weight" and deteriorated commercial value.

Also in the course of distribution, newspaper is put into a corrugated cardboard case for the purpose of absorbing water. But the CA effect is not attained, causing "loss of weight" and deteriorated commercial value.

On the other hand, in case of various plastic films, consideration is given so that there will be attained the CA effect. But because of sealed packaging, the inside assumes a high humidity condition due to the evaporation of water. This excess humid condition and the resulting condensate may cause damage to the rind of a fruit and lowering of sugariness. Further, stagnation of condensate may cause spoilage of that part.

Recently, as a method for removing such condensate in a package and thereby exclude excess humid condition, there has been proposed the use of a water absorbing polymer. As examples of methods which employ a water-absorbing polymer there are mentioned (1) a method wherein a water-absorbing polymer is formed into, for example, pellets, beads or sheet and then placed in a paper bag; (2) a method wherein a composite film comprising a synthetic resin film and paper or non-woven fabric with a water-absorbing polymer put therebetween is inserted into a package, or the said composite film itself is used as a package; and (3) a method wherein a water-absorbing polymer is incorporated in a synthetic resin film, which film is then used as a package.

However, in case of using paper like the above methods (1) and (2), the paper or the non-woven fabric absorbs moisture and retains water so the surface thereof is dewed when the water-absorbing polymer absorbs water; further, the bonding force between the paper and the synthetic resin film or that between the non-woven fabric and the synthetic resin film becomes very weak, resulting in separation from each other and leakage of the water-absorbing polymer.

Additionally, since the maximum pore diameter of paper or non-woven fabric is large, there arises the problem that the water-absorbing polymer used oozes out from the surface of the paper or the non-woven fabric, causing stain of the inside fruits or vegetables and deterioration of commercial value.

In the above method (3), since a water-absorbing polymer is incorporated in the synthetic resin film, there is scarcely any contact thereof with water, so its water absorbing and moisture absorbing and releasing rates at low, that is, its ability to absorb water and moisture and release moisture is extremely poor.

Thus, as to the film for retaining the freshness of vegetables and fruits, studies have heretofore been made about synthetic resin films which control the concentration of oxygen and that of carbon dioxide, or about packages endowed with a water absorbing function by the use of water-absorbing polymers, or about packages with water-absorbing polymers received therein. However, those are not effective to a satisfactory extent, involving problems such as leaking out of water-absorbing polymers or poor water-absorbability.

It is the object of the present invention to provide a film for retaining the freshness of vegetables and fruits which film has overcome the above-mentioned problems of the prior art.

SUMMARY OF THE INVENTION

Having made extensive studies for achieving the above object, the present inventors accomplished the present invention.

The present invention resides in a freshness retaining film comprising a synthetic resin film, a microporous resin film and a water-absorbing layer interposed between both films, characterized in that the said microporous resin film has a maximum pore diameter not larger than 30 μm and a moisture permeability not lower than 100 g/m²/24 hr.

In the freshness retaining film for vegetables and fruits of the present invention, the synthetic resin film controls the concentration of oxygen and that of carbon dioxide, while the combination of a water-absorbing layer and a specific microporous resin film absorbs steam evaporated from vegetables and fruits. In addition, the freshness retaining film of the present invention exhibits the following effects.

There is no exudation of a water-absorbing polymer used.

Superior in heat-sealability.

Delamination does not occur even after absorption of water, preventing exudation of the water-absorbing polymer and preventing direct contact of the water-absorbing polymer with vegetables and fruits.

In case of dewing on the film surface, water is absorbed promptly, so there is attained a satisfactory water and moisture absorbing effect even under a high humidity condition.

Since water-drops are not formed on the film, the surface of the film is dry, not wetting vegetables and fruits.

When the package interior is in an excess humid condition, even if the steam evaporated from vegetables or fruits adhere as water-drops to the film surface, the water-drops will be absorbed promptly. On the other hand, in a lower humidity condition than required, that is, in a dry condition, moisture is released promptly for immediate shift to a humidity condition necessary for retaining the freshness of vegetables and fruits, and it is possible to control the humidity so as to maintain such humidity condition.

DETAILED DESCRIPTION OF THE INVENTION

The synthetic resin film used in the present invention is required to have a carbon dioxide concentration in a package in the range of 0.5% to 10% and an oxygen concentration in the package not higher than 18%, preferably in the range of 2% to 15%, though somewhat different depending on the kind and quantity of vegetables or fruits.

More specifically, it is desirable to use a synthetic resin film having a carbon dioxide permeability at 25° C. of not lower than 5,000 ml/m²/24 hr, preferably in the range of 5,000 to 200,000 ml/m²/hr, more preferably 5,000 to 10,000 ml/m²/24 hr, and an oxygen permeability at 25° C. not lower than 3,000 ml/m²/24 hr, preferably in the range of 3,000 to 500,000 ml/m²/24 hr, more preferably 3,000 to 19,000 ml/m²/24 hr. Examples are polyethylene, polypropylene, polystyrene and ethylene-vinyl acetate copolymer films. These synthetic resin films are preferably so-called non-porous films.

The thickness of the synthetic resin film used in the invention and exemplified above is not specially limited, but from the standpoint of carbon dioxide and oxygen permeability, strength, processability such as heat melt-bonding, and handleability, it is preferable that the thickness of the synthetic resin film be in the range of 5 to 50 μm, particularly 20 to 40 μm. A suitable synthetic resin film may be selected from those available commercially.

The water-absorbing polymer used in the present invention is water-insoluble and has a water absorbability not less than thirty times the own weight. Preferred examples are a starch-polyacrylonitrile copolymer which is disclosed in Japanese Patent Publication No. 43395/1974, a crosslinked polyalkylene oxide disclosed in Japanese Patent Publication No. 39672/1976, a saponified vinyl ester - ethylenically unsaturated carboxylic acid copolymer disclosed in Japanese Patent Publication No. 13495/1978, a self-crosslinking polyacrylate obtained by a reversed-phase suspension polymerization process disclosed in Japanese Patent Publication No. 30710/1979, the reaction product of a polyvinyl alcohol type polymer and a cyclic anhydride disclosed in Japanese Patent Laid Open No. 20093/1979, and a crosslinked polyacrylate disclosed in Japanese Patent Laid Open No. 84305/1980.

The amount of the water-absorbing polymer to be used differs depending on the kind and quantity of vegetables or fruits, packaged condition, state of preservation, etc., but usually it is in the range of 0.001% to 1%, preferably 0.005% to 0.5%, preferably 0.005% to 0.5%, based on the weight of vegetables or fruits. It is preferably in the range of 1 to 100 grams per square meter of the film.

Further, for the purpose of adsorbing gas such as ethylene, there may be used together with the water-absorbing polymer an inorganic substance such as active carbon, zeolite, zeolitic microporous substance, cristobalite, silica-based microporous substance and calcium silicate.

For the purpose of further improving the freshness retaining effect, there may be added an antibacterial agent, a deodorant, etc.

If desired, moreover, an adhesive may be incorporated in the water-absorbing layer in order to improve the adhesion between the synthetic resin film and a later-described microporous resin film. As examples of such adhesive there are mentioned vinyl resins, cellulose resins, epoxy resins and polyurethanes.

In the present invention, the water-absorbing layer is combined with a specific microporous resin film about to be described, whereby in an excess humid condition, even if the steam evaporated from vegetables or fruits adheres as water-drops to the film surface, the water drops will be adsorbed promptly. On the other hand, in a lower humidity condition than required, that is, in a dry condition, moisture is released promptly to make an immediate shift into a humidity condition necessary for retaining the freshness of vegetables or fruits, and this humidity condition is maintained. As a result, the freshness of vegetables or fruits can be retained over a long period.

The microporous resin film used in the present invention is not specially limited if only it is a synthetic resin film having a maximum pore diameter not larger than 30 μm and a moisture permeability not lower than 100 g/m²/24 hr.

The following methods are mentioned as examples of methods for preparing the microporous resin film.

(a) A polyolefin resin is melt-stretched followed by heat treatment and re-stretching.

(b) In a synthetic resin is incorporated a liquid or solid which is incompatible with the synthetic resin, followed by forming into film and subsequent extraction of the incorporated liquid or solid.

(c) Film is formed from a synthetic resin and then perforated with needles to obtain a microporous film.

(d) A filler is added to a synthetic resin and the mixture is melted and formed into film, followed by stretching at least uniaxially, or after stretching at least uniaxially, the soluble filler is extracted using water, acid, or alkali.

Particularly, the above method (d) is preferred in point of high productivity and low cost.

As the synthetic resin used in the above method (d), a polyolefin resin is preferred. Examples are homo- and copolymers of polyethylene, polypropylene and polybutadiene, as well as blends thereof. Those having compositions superior in stretchability are preferred. Particularly suitable are polypropylenes, high-density polyethylenes (HDPE) and linear low-density polyethylenes (L-LDPE).

As fillers there may be used inorganic and organic fillers. Examples are calcium carbonate, talc, clay, kaolin, silica, diatomaceous earth, magnesium carbonate, barium carbonate, magnesium sulfate, barium sulfate, calcium sulfate, aluminum hydroxide, zinc oxide, magnesium hydroxide, calcium oxide, magnesium oxide, titanium oxide, alumina, mica, asbestos powder, glass powder, pumice, zeolite and silicious white earth. Particularly, calcium carbonate, talc, clay, silica, diatomaceous earth and barium sulfate are preferred.

Examples of organic fillers include wood powder, pulp, melamine powder and silicone resin powder.

The fillers exemplified above are not larger than 10 $\mu$m in average particle diameter, preferably in the range of 0.5 to 5 $\mu$m from the standpoint of miscibility with the synthetic resin and homogenizing of the film. The amount of the filler used in the above method (d) is in the range of 50 to 300 parts by weight, preferably 100 to 200 parts by weight, based on 100 parts by weight of the synthetic resin.

It is necessary that the maximum pore diameter of the microporous resin film be not larger than 30 $\mu$m. If it is larger than 30 $\mu$m, the strength of the film will be markedly deteriorated, resulting in partial breakage during handling of the film, or in case of making a bag by heat-sealing this freshness retaining film, delamination may occur due to deteriorated sealing strength, or the water-absorbing polymer may ooze out from the film surface.

The maximum pore diameter of the microporous resin film is measured by a bubble point method using a coaltar porometer manufactured by Coaltar Electronics Company, U.S.A.

In order to attain high water absorbing and moisture absorbing and releasing rates, it is preferable that the moisture permeability of the microporous film be not lower than 100 g/m$^2$/24 hr (JIS Z-0208). In this case, a suitable moisture permeability is selected according to the kind and quantity of vegetables or fruits.

In order to surely prevent the formation of condensate or dew water and increase the water absorbing and moisture absorbing and releasing rates, it is preferable that the microporous resin film be subjected to a hydrophilicizing treatment.

The hydrophilicizing treatment may be carried out, for example, by a method wherein a surfactant is kneaded into the microporous resin film, or a dipping or spraying method wherein a surfactant is applied to the surface of the microporous resin film.

Using such synthetic resin film, water-absorbing polymer and microporous resin film, there is formed a laminated film. The laminated film may be formed, for example, by a method wherein the water-absorbing polymer is sandwiched in between the synthetic resin film and the microporous resin film, followed by partial bonding such as partial heat sealing, or a method wherein a coating solution prepared by mixing the water-absorbing polymer with an adhesive is applied to the surface of the synthetic resin film by gravure coating, roll coating, or silk screen process, followed by lamination with the microporous resin film. Particularly, the latter method is preferred. In this case, it is preferred that the proportion of the water-absorbing polymer be not less than 20 parts by weight, more preferably not less than 50 parts by weight, based on 100 parts by weight of the adhesive.

Further, the water-absorbing polymer or the adhesive may be used in the form of a partial pattern according to the bonding force between the synthetic resin film and the microporous resin film as well as the water and moisture absorbing ability.

In the freshness retaining film obtained in the above manner, the oxygen permeability thereof is not lower than 2,000 ml/m$^2$/24 hr/atm, preferably in the range of 2,000 to 200,000 ml/m$^2$/24 hr/atm more preferably 2,000 to 15,000 ml/m$^2$/24 hr/atm.

If the oxygen permeability is lower than 2,000 ml/m$^2$/24 hr/atm, the carbon dioxide concentration in package will become higher due to breathing of the inside agricultural food, resulting in that some particularly kinds of agricultural foods may cause a carbon dioxide trouble. On the other hand, if the oxygen permeability exceeds 200,000 ml/m$^2$/24 hr/atm, it is impossible to suppress the breathing of the inside agricultural food to a satisfactory extent, that is, the freshness of the agricultural food cannot be retained over a long period.

As the bonding method for obtaining a package to keep the freshness of vegetables and fruits using the freshness retaining film of the present invention, it is desirable to use an ultrasonic sealing method, heat sealing method, or impulse sealing method.

How to use the freshness retaining film of the present invention is not specially limited. Not only in the form of a bag to seal vegetables or fruits therein but also the film may be in the form of a cloth wrapper to package and preserve vegetables or fruits like a handkerchief package, or a corrugated cardboard case may be lined with the film, or the film may be put into a corrugated cardboard case together with vegetables or fruits and used at the time of preservation or distribution. Further, the film of the present invention may be attached to a window portion of a container. It is used so that the microporous film side comes into contact with vegetables or fruits.

The present invention will be described below in detail in terms of working examples, but the invention is not limited thereto.

How to Prepare the Freshness Retaining Film of Present Invention

There were used the following (a) synthetic resin films, (b) water-absorbing layer materials and (c) microporous resin film.

(a) Synthetic Resin Films

There were used polyethylene films having a density of 0.927 g/cm$^3$, an MI of 2.0 and thicknesses of 15 and 30 $\mu$m, and an ethylene-vinyl acetate (vinyl acetate 28%) copolymer film having a thickness of 10 $\mu$m which are commercially available. Their oxygen permeability ($O_2P$; $ml/m^2/24$ hr/atm) and carbon dioxide permeability ($CO_2P$; $ml/m^2/24$ hr/atm) at 25° C. are as follows:

| Thickness | $O_2P$ | $CO_2P$ |
|---|---|---|
| Polyethylene films: | | |
| 15 μ | 14,000 | 33,000 |
| 30 μ | 6,000 | 23,000 |
| Ethylene-vinyl acetate copolymer film: | | |
| 10 μ | 20,000 | 60,000 |

(b) Water-absorbing Polymer

A starch-polyacrylic acid graft copolymer (Sanwet IM-300, a product of Sanyo Chemical Industries, Ltd.). Also, as an urethanic adhesive there was used (EPS-75A), a product of Dainippon Ink & Chemicals, Inc.

(c) Microporous Resin Film 150 parts by weight of barium sulfate was added for 100 parts by weight of a linear low-density polyethylene, followed by melting and forming into film and subsequent stretching to obtain a film having a thickness of 30 μm, a moisture permeability of 1,400 $g/m^2/24$ hr and a maximum pore diameter of 7.5 μm. Further, in order to increase the water absorbing speed, a 10 wt% solution of a phenolic surfactant (MTN F684, a product of Marubishi Yuka K.K.) in isopropyl alcohol was applied onto the film surface by a dipping method and thus a hydrophilicizing treatment was performed.

PREPARATION EXAMPLE - 1

100 parts by weight of the urethanic adhesive and 100 parts by weight of the water-absorbing polymer (b) were mixed together at low speed in a homomixer and the resultant mixture was applied to the surface of the 15 μm thick polyethylene film (a) to result in 8 $g/m^2$ in terms of the amount of the water-absorbing polymer by means of a gravure coating roll to form a water-absorbing layer. Thereafter, the microporous resin film (c was laminated to the water-absorbing layer to obtain a freshness retaining film according to the present invention, which film was found to have an oxygen permeability of 13,000 $ml/m^2/24$ hr/atm.

PREPARATION EXAMPLE - 2

100 parts by weight of the urethanic adhesive and 100 parts by weight of the water-absorbing polymer (b) were mixed together at low speed in a homomixer and the resultant mixture was applied to the surface of 30 μm thick polyethylene film (a) to result in 8 $g/m^2$ in terms of the amount of the water-absorbing polymer by means of a gravure coating roll to form a water-absorbing layer. Thereafter, the microporous resin film (c) was laminated to the water-absorbing layer to obtain a freshness retaining film according to the present invention, which film was found to have an oxygen permeability of 4,500 $ml/m^2/24$ hr/atm.

PREPARATION OF EXAMPLE - 3

100 parts by weight of the urethanic adhesive and 100 parts by weight of the water-absorbing polymer were mixed together at low speed in a homomixer and the resultant mixture was applied onto the surface of the 10 μm thick ethylene-vinyl acetate copolymer film to result in 8 $g/cm^2$ in terms of the amount of the water-absorbing polymer by means of a gravure coating roll to form a water-absorbing layer. Thereafter, the microporous resin film (c) was laminated to the water-absorbing layer to obtain a freshness retaining film according to the present invention, which film was found to have an oxygen permeability of 18,000 $ml/m^2/24$ hr/atm.

EXAMPLE - 1

The freshness retaining film obtained in Preparation Example-1 and the 10 μm polyethylene film (a) were each cut into the size of 40 cm long by 30 cm wide. Then, the film (c) side of the freshness retaining film and the 10 μm polyethylene film (a) were lapped together and three peripheral edges were heat-sealed to obtain a package having one open end.

1.5 kg of Japanese lemon (kabosu) was put into the package, which was stored at 2° C., while observation was made with time. Percent spoilage as well as the concentration of carbon dioxide and that of oxygen gas after four and five months are as shown in Table 1.

EXAMPLE - 2

The freshness retaining film obtained in Preparation Example-2 and the 30 μm polyethylene film (a) were each cut into the size of 40 cm long by 30 cm wide. Then, the film (c) side of the freshness retaining film and the 30 μm polyethylene film (a) were lapped together and three peripheral edges were heat-sealed to obtain a package having one open end.

1.5 kg of Japanese lemon (kabosu) was put into the package, which was stored at 2° C., while observation was made with time. Percent spoilage as well as the concentration of carbon dioxide and that of oxygen gas are as shown in Table 1.

EXAMPLE - 3

The freshness retaining film obtained in Preparation Example-3 and the 30μm polyethylenen film (a) were each cut into the size of 40 cm long by 30 cm wide. Then, the film (c) side of the freshness retaining film and the 30 μm polyethylene film (a) were lapped together and three peripheral edges were heat-sealed to obtain a package having one open end.

1.5 kg of Japanese lemon (kabosu) was put into the package, which was stored at 2° C., while observation was made with time. Percent spoilage as well as the concentration of carbon dioxide and that of oxygen gas after four and five months are as shown in Table 1.

COMPARATIVE EXAMPLE - 1

A package was formed using only the 30 μm polyethylene film (a) and the same test as in Example-1 was conducted. Percent spoilage and the concentration of carbon dioxide and that of oxygen gas after four and five months are as shown in Table 1.

COMPARATIVE EXAMPLE - 2

Into the package formed using the 30μm polyethylene film in Comparative Example-1 was placed a commercially available Noiparone (a product of Sekisui Jushi K.K.) and the same test as in Example-1 was conducted. Percent spoilage and the concentration of carbon dioxide and that of oxygen gas after four and five months are as shown in Table 1.

EXAMPLE - 4

128 g of spinach was washed with water, then water was drained off by merely shaking the spinach up and down and thereafter packaged like a handkerchief package using the freshness retaining film obtained in Preparation Example-2. The packaged was preserved at 5° C. for 10 days.

As a result, condensate, or dew water, was not observed at all; besides, any of such abnormal conditions as whithering, change of color and crying was not observed.

COMPARATIVE EXAMPLE - 3

Using the same 30 μm polyethylene film as that used in Comparative Example-1, there was conducted the same test as in Example-3. After seven days of preservation, condensate was observed at many points on the inner surface of the package, and whithering and change of color were also observed partially, thus showing marked deterioration of the commercial value.

EXAMPLE - 5

673 g of carrots were washed with water, then water was drained off by shaking the carrots merely up and down, thereafter the carrots were sealed into a 2.5-liter package formed using the freshness retaining film obtained in Preparation Example-2, and preserved at 20° C. for one month. As a result, condensate was not observed at all, nor was observed any of such abnormal conditions as change of color and drying.

COMPARATIVE EXAMPLE - 4

Using the 30 polyethylene film as that used in Comparative Example-2, there was conducted the same test as in Example-4. After one month of preservation, condensate was observed at many points on the inner surface of the package and something like mold was observed at the neck portions of some of the carrots; besides, there occurred a change of color partially. Thus, a marked deterioration of the commercial value was recognized.

EXAMPLE - 6

A corrugated cardboard case (280×370×118.5 mm) was lined with the freshness retaining film obtained in Preparation Example-2. 6 kg of green asparagus was washed with water, then water was drained off by shaking the asparagus merely up and down and thereafter the green asparagus was packed into the corrugated cardboard case lined with the freshness retaining film, which case was transported at 20° C. from Hokkaido to Tokyo. The results are as set forth in Table 2.

COMPARATIVE EXAMPLE - 5

6 kg of green asparagus was washed with water, then water was drained off by shaking merely up and down and thereafter the asparagus was packed into a corrugated cardboard case (280×370×118.5 mm), which case transported at 20° C. from Hokkaido to Tokyo. The results are as set forth in Table 2.

The present invention uses a freshness retaining film having the construction described above as a film for packaging vegetables and fruits, whereby the following effects are attained.

1 The synthetic resin film permits controlling the concentration of carbon dioxide and that of oxygen gas to values suitable for vegetables or fruits to be preserved.

2 Condensate, or dew water, formed within a package can be absorbed and removed by the water absorbing polymer.

When the humidity in a package is high, the moisture in the package is absorbed by the combination of the water-absorbing polymer with a specific microporous resin film, while in a lower humidity condition than required, that is, in a dry condition, the water and moisture which have been absorbed are released. Thus, by repeating the absorption of water and moisture and the release thereof it is possible to keep constant the internal humidity of the package.

3 The presence of a microporous film having a maximum pore diameter not larger than 30μ prevents the water-absorbing polymer from oozing out from the film surface and thus prevents the film surface from becoming wet. Moreover, because of a good heat-sealability it is possible to prevent delamination of the sealed portion and leakage of the water-absorbing polymer after the absorption of water and moisture.

Further, since water-drops are not formed on the film surface, the inside vegetables or fruits are not wet, resulting in that the freshness thereof can be retained over a long period.

In the preservation of vegetables and fruits using the freshness retaining film of the present invention exhibiting the above effects, there was recognized a very superior freshness and quality retaining effect.

The combination of the water-absorbing layer with a specific microporous film is advantageous in that in an excess humid condition, even if the steam evaporated from vegetables or fruits adheres as drops to the film surface, the water-drops will be absorbed promptly, while in a dry condition, the absorbed water and moisture will be released promptly.

TABLE 1

|  | Percent Soundness* (%) | | Concentration of Oxygen (%) | | Concentration of Carbon Dioxide (%) | |
| --- | --- | --- | --- | --- | --- | --- |
|  | After 4 months | After 5 months | After 4 months | After 5 months | After 4 months | After 5 months |
| Example 1 | 95 | 94 | 14.6 | 12.0 | 3.0 | 3.2 |
| Example 2 | 100 | 100 | 12.5 | 10.6 | 3.1 | 3.7 |
| Example 3 | 89 | 70 | 17.8 | 14.8 | 3.2 | 3.6 |
| Comparative Example 1 | 77.8 | 27.8 | 12.5 | 11.4 | 2.9 | 3.5 |
| Comparative Example 2 | 85 | 50 | 12.0 | 10.2 | 3.3 | 3.8 |

*In Table 1, the "percent soundness" indicates the percentage of abnormal conditions such as change in color and in quality being not recognized at all after preservation of Japanese lemon (kabosu) at 7° C. for four or five months.

TABLE 2

|  | Loss of Weight | Appearance | Mouth Feel | Intra-case Humidity |
| --- | --- | --- | --- | --- |
| Example 6 | 1.2% | No withering | Resistant to the teeth | 98% |
| Comparative | 4.0% | Withering | No resistance | 60% |

TABLE 2-continued

| | Loss of Weight | Appearance | Mouth Feel | Intra-case Humidity |
|---|---|---|---|---|
| Example 2 | | observed | to the teeth | |

What is claimed is:

1. A freshness retaining film comprising a synthetic resin film, a microporous resin film and a water-absorbing layer interposed between both said films, said microporous resin film having a maximum pore diameter not larger than 30 microns and a moisture permeability not lower than 100 g/m$^2$/24 hr.

2. A freshness retaining film as set forth in claim 1, wherein said microporous resin film has been subjected to a hydrophilicizing treatment.

3. A freshness retaining film as set forth in claim 1, wherein said water-absorbing layer is formed by a water-absorbing polymer having a water absorbability not less than thirty times the own weight thereof.

4. A freshness retaining film as set forth in claim 1, wherein said water-absorbing layer is interposed partially between both said films.

5. A freshness retaining film as set forth in claim 1, wherein said synthetic resin film has a carbon dioxide permeability at 25° C. of not lower than 5,000 ml/m$^2$/24 hr and an oxygen permeability at 25° C. of not lower than 3,000 ml/m$^2$/24 hr.

6. A freshness retaining film as set forth in claim 1, having an oxygen permeability not lower than 2,000 ml/m$^2$/24 hr/atm.

7. A freshness retaining film as set forth in claim 1, having an oxygen permeability in the range of 2,000 to 15,000 ml/m$^2$/24 hr/atm.

* * * * *